(12) United States Patent
Han

(10) Patent No.: US 7,732,072 B2
(45) Date of Patent: Jun. 8, 2010

(54) RECHARGEABLE BATTERY

(75) Inventor: Kyu Nam Han, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 922 days.

(21) Appl. No.: 11/034,209

(22) Filed: Jan. 13, 2005

(65) Prior Publication Data

US 2005/0175889 A1  Aug. 11, 2005

(30) Foreign Application Priority Data

Jan. 13, 2004  (KR) .................. 10-2004-0002442

(51) Int. Cl.
*H01M 14/00* (2006.01)
*H01M 10/00* (2006.01)
*H01M 2/04* (2006.01)

(52) U.S. Cl. .................. 429/7; 429/122; 429/170

(58) Field of Classification Search .............. 24/94, 24/584.1, 602, 682, 324, 594.11, 578.15
See application file for complete search history.

(56) References Cited

U.S. PATENT DOCUMENTS

| | | | | |
|---|---|---|---|---|
| 2,895,199 | A | * | 7/1959 | Jones ..................... 24/618 |
| 4,226,497 | A | * | 10/1980 | Polonsky et al. .......... 439/677 |
| 2002/0142195 | A1 | * | 10/2002 | Ehara ..................... 429/7 |
| 2004/0018396 | A1 | * | 1/2004 | Dorren et al. ............. 429/7 |
| 2004/0170887 | A1 | * | 9/2004 | Masumoto et al. ......... 429/61 |

FOREIGN PATENT DOCUMENTS

JP    2003-308881    10/2003

OTHER PUBLICATIONS

IPDL machine translation of JP2003-308881.*

* cited by examiner

*Primary Examiner*—Dah-Wei D Yuan
*Assistant Examiner*—Maria J Laios
(74) *Attorney, Agent, or Firm*—H.C. Park & Associates, PLC

(57) ABSTRACT

Disclosed is a rechargeable battery including: a bare cell composed of an electrode assembly including a negative electrode, a separator and a positive electrode, a container for housing the electrode assembly and an electrolyte, and a cap assembly for closing an opening of the container; and a safety device electrically coupled to an outer surface of the bare cell, wherein the safety device is coupled to the bare cell by being incorporated into a battery component part, and each of bonding surfaces of the bare cell and the battery component to be bonded to each other has a bonding parts capable of forming a mechanical bonding between the bare cell and the battery component. The rechargeable battery permits a safety device such as a protective circuit board and a bimetal device to be coupled to a bare cell in a stable and simple manner. Additionally, the mechanical bonding parts between the safety device and the bare cell can be separated so that the safety device such as a protective circuit board can be reused.

18 Claims, 3 Drawing Sheets

US 7,732,072 B2

RECHARGEABLE BATTERY

CROSS REFERENCE TO RELATED APPLICATION

This application claims priority to and the benefit of Korean Patent Application No. 2004-0002442, filed on Jan. 13, 2004, which is hereby incorporated by reference for all purposes as if fully set forth herein.

BACKGROUND OF THE INVENTION

1. Field of the Invention

The present invention relates to a rechargeable battery, and more particularly to a rechargeable battery including a bare cell having an electrode assembly, a can and a cap assembly, and a protective circuit board electrically and mechanically connected to the bare cell.

2. Description of the Prior Art

As generally known in the art, rechargeable batteries are rechargeable and can be made in a compact form with a large capacity for energy storage, and thus have been broadly researched and developed recently. Typical examples of such rechargeable batteries include nickel-hydrogen (Ni—H) batteries, lithium (Li) batteries and lithium-ion (Li-ion) batteries.

In such rechargeable batteries, most bare cells are formed by inserting an electrode assembly composed of a positive electrode, a negative electrode, and a separator into a container formed of a metal such as aluminum or aluminum alloys, closing the container with a cap assembly, injecting an electrolyte into the container, and then sealing the container. Although the container may be formed of iron compounds, a container formed of aluminum or aluminum alloys has an advantage in that it weighs less by virtue of the light weight of aluminum itself. A battery formed of an aluminum container is free of corrosion while used for a long time under a high voltage.

However, a battery, as an energy source, has a great potential to discharge a large amount of energy. In the case of a rechargeable battery, a large amount of energy is stored in a charged state. Also, in order to charge a rechargeable battery, an external energy source is needed to supply the energy to be stored in the battery. When internal short circuit or malfunction of a rechargeable battery occurs during the above described process or state, the energy stored in the battery may be discharged quickly, thereby causing safety problems such as fire, explosion, or the like.

Lithium rechargeable batteries, which are being used increasingly, include lithium having a high activity, and thus have a great potential for fire or explosion when they are defective. In the case of a lithium ion battery, lithium exists not in a metal state but in an ion state, and thus the safety of the battery is higher than a battery using lithium metal. However, negative electrode materials and non-aqueous electrolytes, etc. used in the battery are flammable, and thus there is a great possibility for fire or explosion when the battery is defective.

Accordingly, in general, a rechargeable battery is equipped with various kinds of safety devices for preventing fire or explosion caused by defect of the battery itself in a charged state or during the charge process of the battery. These safety devices are generally connected to a positive terminal and a negative terminal of a bare cell through a conductive structure, such as a lead plate. These safety devices can interrupt the flow of electric current, for example, when a battery is overheated or a battery voltage rapidly changes due to overcharge/overdischarge, etc., thereby preventing dangers such as explosion or ignition of the battery. Typical examples of safety devices coupled with a bare cell include a protective circuit board that can detect abnormal electric current or voltage to interrupt electric current, a Positive Temperature Coefficient (PTC) device operated according to the occurrence of overheating due to abnormal electric current, a bimetal device, etc.

A rechargeable battery having a bare cell coupled with a safety device is contained in a separate casing so that the rechargeable battery has a finished outer appearance. Further, a bare cell and a safety device, such as a protective circuit board, connected to the bare cell are fixed to each other and are encapsulated with plastic molding to fill the gap between the bare cell and the protective circuit board, resulting in a rechargeable battery having a finished appearance.

In general, rechargeable batteries are made from different materials, and are made into various shapes, sizes, etc., depending on their manufacturers and product models. Accordingly, the design of a suitable safety device is also varied according to such factors. Additionally, general manufacturers of rechargeable batteries integrate a bare cell and a protective circuit board, etc., into one body. In most cases, the compositional material and design are predetermined because the rechargeable battery forms a part of a product set to which it is mounted. Therefore, even if a rechargeable battery has the same operating conditions and functions in the same way as another battery meant for the exclusive use in a desired product set, it is not possible to use the rechargeable battery in the product.

Under these circumstances, rechargeable batteries have no interchangeability among various products, and thus it is difficult for consumers to optionally select a rechargeable battery for use in a desired product.

To solve this problem, a rechargeable battery that can be used in various products has been developed. In order to accomplish this, a rechargeable battery is often made as a pack-type battery, in which the terminals of a bare cell and those of a safety device such as a protective circuit board are bonded by welding, and the space between the bare cell and the protective circuit board is filled with a plastic molding, thereby bonding the bare cell with the protective circuit in a physical manner.

FIG. 1 is a schematic exploded perspective view showing a conventional pack-type lithium-ion battery, before coupling with a plastic molding. FIG. 2 is a sectional view showing a conventional pack-type lithium ion rechargeable battery, which has been coupled with a plastic molding.

Referring to FIGS. 1 and 2, in a pack-type battery, a protective circuit board 30 is disposed parallel to the surface of a bare cell, on which electrode terminals 130, 111 are disposed. Additionally, as shown in FIG. 2, a gap between the bare cell 100 and the protective circuit board is filled with a plastic molding 20. When the gap is filled with the plastic molding 20, the molding may cover even the outer surface of the protective circuit board. However, external input/output (I/O) terminals 31, 32 must be exposed to the exterior.

The bare cell 100 includes a positive terminal 111 and a negative terminal 130 on the surface facing the protective circuit board 30. The positive terminal 111 may be a cap plate that is formed of aluminum or aluminum alloys, or a nickel-containing metal plate bonded to a cap plate. The negative terminal 130 protrudes from a cap plate 110, and is electrically isolated from the cap plate 110 by a peripheral insulator gasket.

The protective circuit board 30 includes a panel formed of a resin, on which a circuit is disposed, and the external I/O terminals 31, 32 are formed on the outer surface thereof. The protective circuit board 30 has a dimension and a shape that are substantially the same as those of the surface (cap plate 110 surface) of the bare cell 100 facing thereto.

The internal surface of the protective circuit board 30 opposite to the outer surface, on which external terminals 31, 32 are formed, is equipped with a circuit section 35 and connection terminals 36, 37. The circuit section 35 includes, for example, a protective circuit for protecting a battery from overcharge/overdischarge during charge/discharge of the battery. The circuit section 35 and each external I/O terminal 31, 32 are electrically connected to each other by a conductive structure passing through the protective circuit board 30.

Connection leads 41, 42 and an insulating plate 43, etc., are disposed between the bare cell 100 and the protective circuit board 30. The connection leads 41, 42, which are generally formed of nickel, are used for the purpose of making electric connection between the cap plate 110 and each connection terminal 36, 37 of the protective circuit board 30. They may have an "L"-shaped form or a planar structure. In order to make electric connection between each connection lead 41, 42 and each terminal 36, 37, a resistance spot welding method may be used. In the embodiment as shown in FIG. 1, a separate breaker is formed in a connection lead 42 disposed between the protective circuit board and the negative terminal. In this case, the circuit section 35 of the protective circuit board has no breaker. The insulating plate 43 is positioned to electrically insulate the connection lead 42 connected to the negative terminal 130 from the cap plate 110 as a positive terminal.

However, when the bare cell 100 and other battery components including the protective circuit board 30 are incorporated into a pack-type battery using a plastic molding, certain mechanical problems arise. Plastic molding part 20 for securely coupling the battery components including the protective circuit board 30 with the bare cell 100 is made of a material different from that of the bare cell 100 including metallic components, such as the cap plate 110 and the can, and has a small contact area with the bare cell 100, thereby showing a weak bonding strength.

For the purpose of increasing the bonding strength, increasing the size of a connection structure such as a lead plate or formation of a separate reinforcing structure may be considered. For example, an embodiment in which a separate reinforcing structure is welded to a cap plate, with a space partially formed between the reinforcing structure and the bare cell so that the space may be filled with a plastic molding while the plastic molding covers the reinforcing structure may be considered. However, in order to form such a reinforcing structure, additional materials and welding processes are needed.

Additionally, in order to pour and cure a resin for plastic molding between the bare cell and the protective circuit board, a mold is needed and should be removed after use, thereby complicating the manufacturing process. Moreover, there is an additional problem in that when a resin for plastic molding is poured, the resin is not uniformly distributed in the gap between the protective circuit board and the bare cell. Particularly, when using a reinforcing structure with a complicated form, it is very difficult to fill the gap between the protective circuit board and the bare cell uniformly with the resin for plastic molding.

In addition, when resin is poured into the gap between the bare cell and the protective circuit board so as to form the plastic molding, the connection parts of terminals, protective circuit board, PTC, etc., are embedded in the plastic molding together, and thus it is not possible to separate them individually. Therefore, when the bare cell is discarded, a safety device attached thereto should also be discarded.

SUMMARY OF THE INVENTION

The present invention solves the above-mentioned problems occurring in the prior art. Accordingly, an object of the present invention is to provide a rechargeable battery formed in such a manner that a bare cell can be coupled with a safety device such as a protective circuit board, in a stable and simple manner.

It is another object of the present invention to provide a rechargeable battery formed in such a manner that the problems of conventional pack-type batteries can be avoided. Such problems include that complicated plastic molding process is used, the gap between the protective circuit board and the bare cell is not uniformly filled with a resin for plastic molding, and the bond between the protective circuit board and the bare cell is weak.

It is still another object of the present invention to provide a rechargeable battery assembled in such a manner that a safety device attached to a bare cell can be recycled and reused, even if the bare cell is discarded.

In order to accomplish these objects, the present invention provides a rechargeable battery including a bare cell and a safety device coupled to the bare cell. The safety device, such as a protective circuit board, is fixed with a plastic molding or a casing to form a battery component part, and each of the outer surface of the bare cell and the surface of the battery component part, which are to be bonded to each other, has a bonding part capable of forming a mechanical bond between both surfaces.

According to the present invention, the bonding surface of the battery component part including the safety device such as a protective circuit board and the bonding surface of the bare cell generally have electric terminals or electric connections. To simplify the structure of a rechargeable battery, it is preferable that at least a part of the bonding part functions not only as a mechanical bonding part between the bare cell and the safety device, but also as an electric terminal for making an electric connection.

Since the mechanical bonding parts have an additional function as electric connectors between the bare cell and the battery component part including the safety device the bond formed between the bare cell and the battery component part is not a permanent bond but a detachable bond. That is, the battery component part can be separated from the bare cell and then reused, even if the bare cell is used up to the end of its life.

BRIEF DESCRIPTION OF THE DRAWINGS

The above and other objects, features and advantages of the present invention will be more apparent from the following detailed description taken in conjunction with the accompanying drawings.

DETAILED DESCRIPTION OF THE PREFERRED EMBODIMENTS

Figure 1:
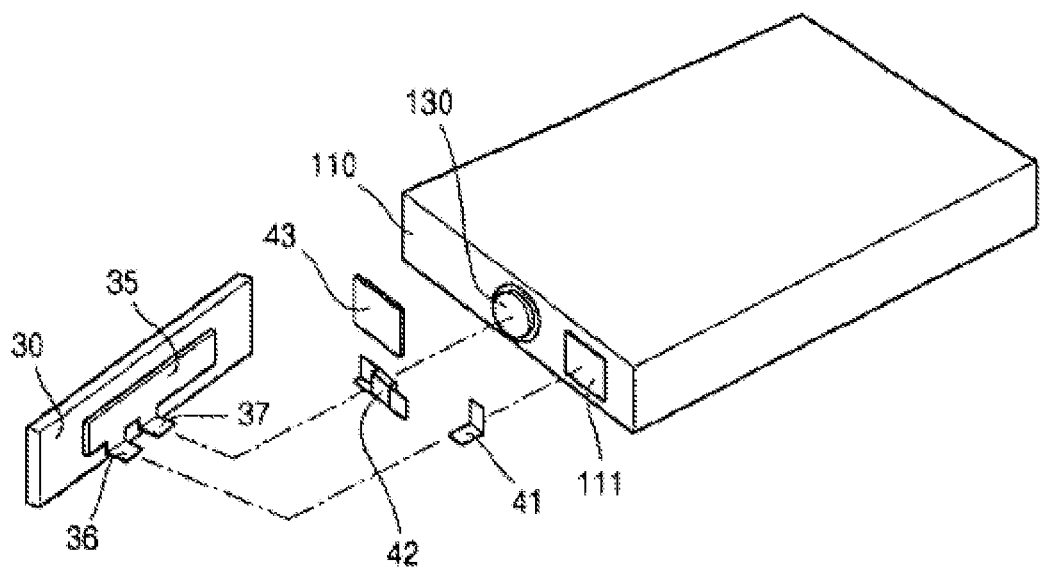
FIG. 1 is a schematic exploded perspective view showing a conventional pack-type lithium-ion battery, before coupling with a plastic molding.
Figure 2:
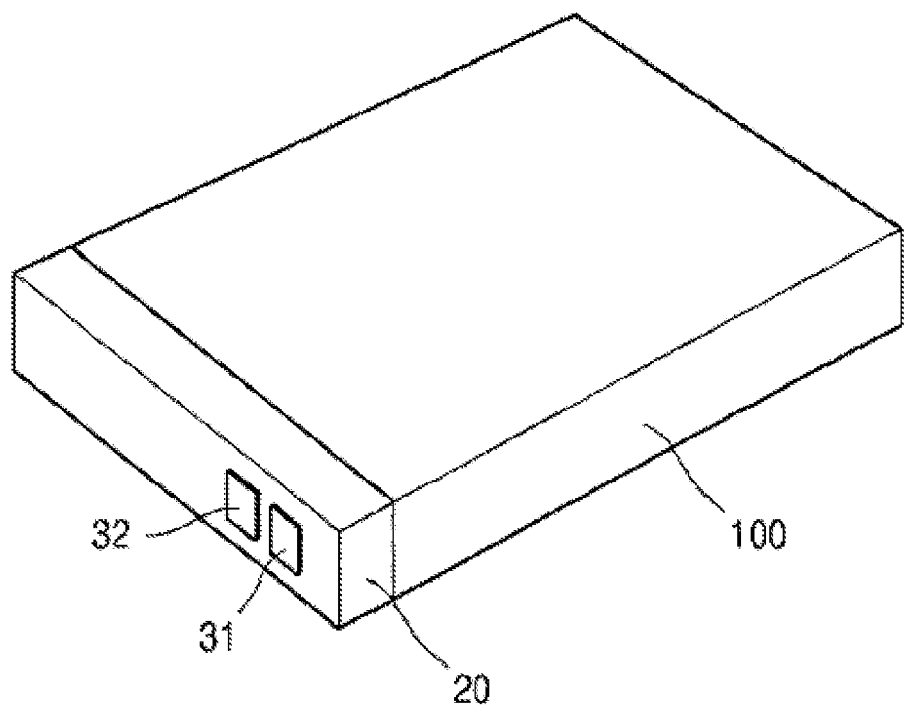
FIG. 2 is a sectional view showing a conventional pack-type lithium ion rechargeable battery, which has been coupled with a plastic molding.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
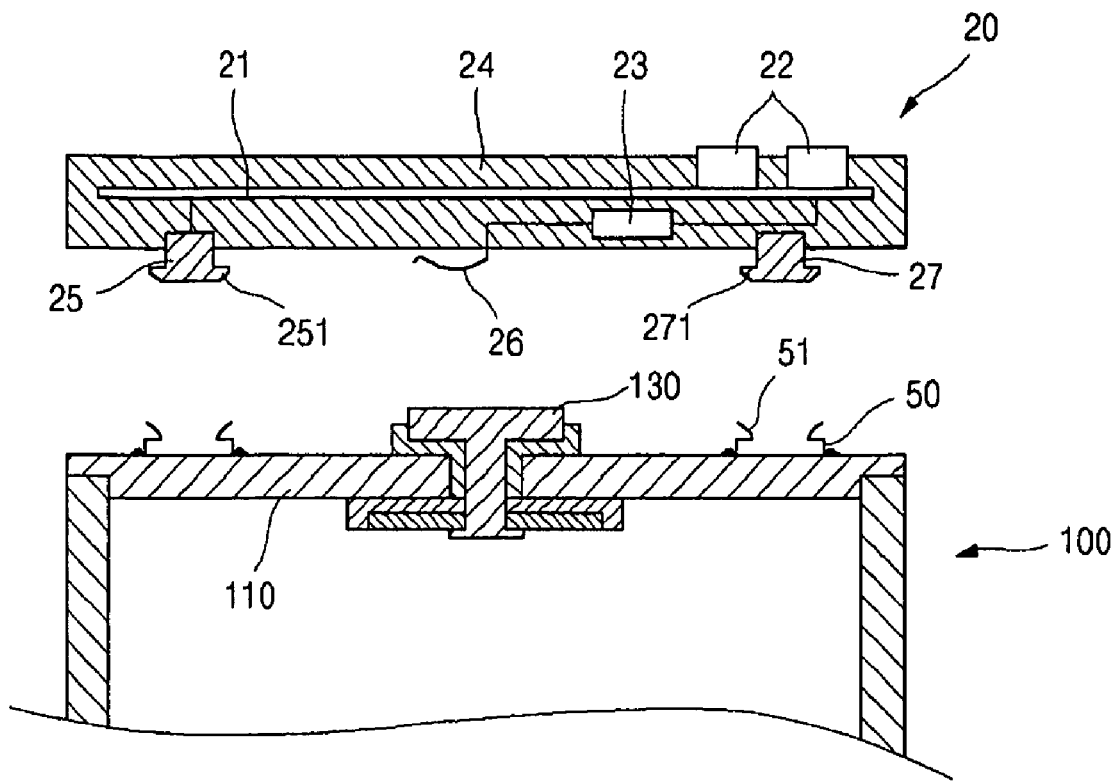
FIGS. 3 and 5 are schematic sectional views showing the structure of a battery component part and the upper part of a bare cell according to preferred embodiments of the present invention.
Figure 4:
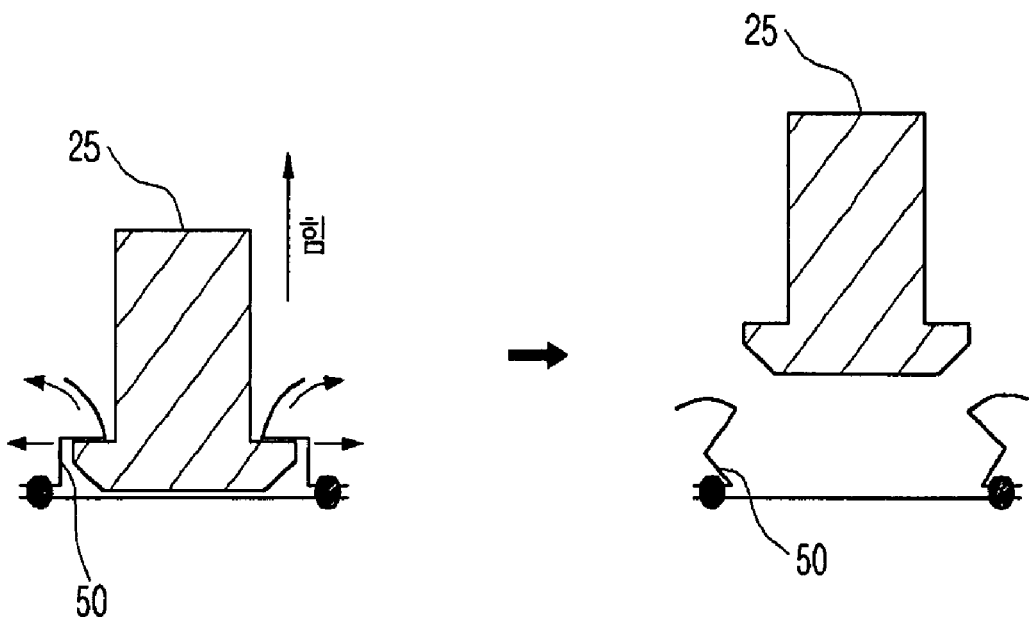
FIG. 4 is an illustrative view showing how to separate a coupled structure of a battery component part and a bare cell in the embodiment as shown in FIG. 3.
Figure 5:
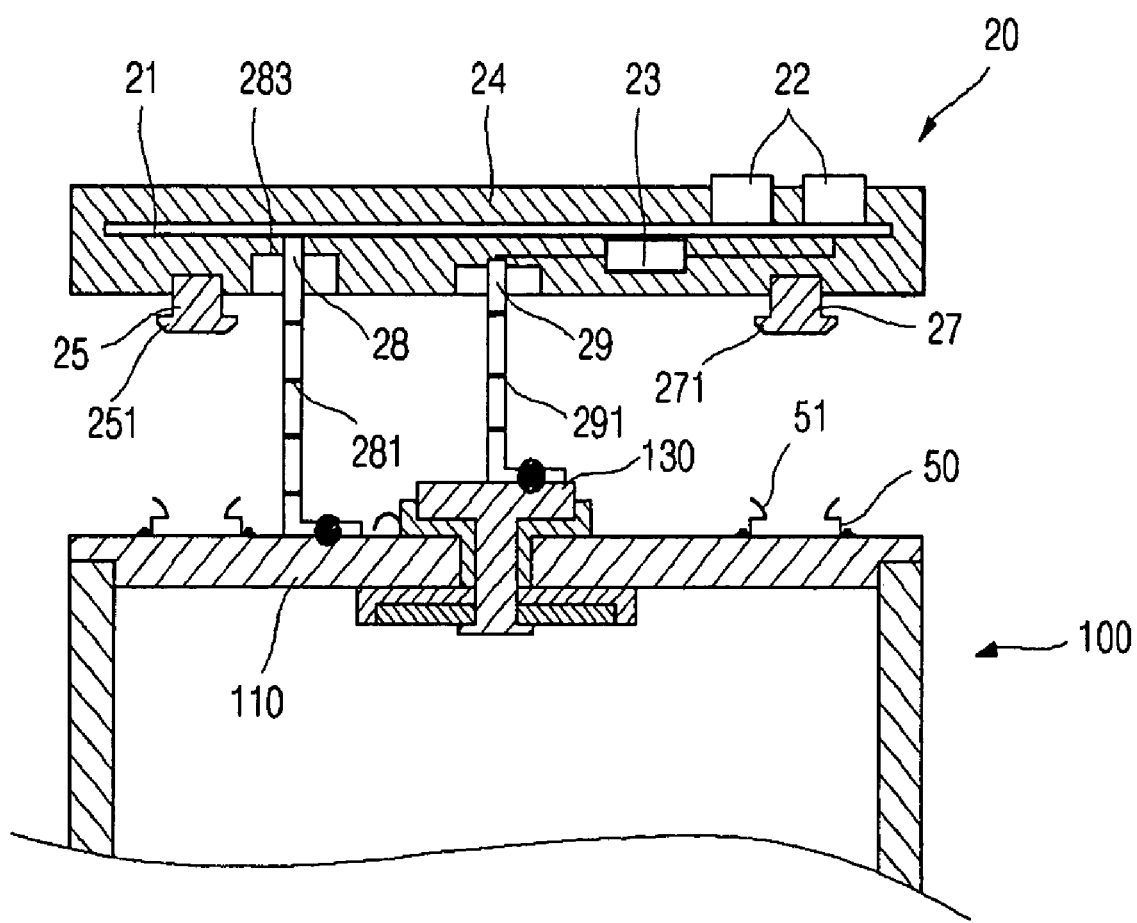

FIGS. 3 and 5 are schematic sectional views showing the structure of a battery component part and the upper part of a bare cell according to preferred embodiments of the present invention; and FIG. 4 is an illustrative view showing how to separate a coupled structure of a battery component part and a bare cell in the embodiment as shown in FIG. 3.

Referring to FIG. 3, a rechargeable battery includes a battery component part 20 and a bare cell 100. The battery component part 20 includes a protective circuit board 21 and a bimetal device 23 that are connected to each other in series through electric terminals, the protective circuit board 21 and a bimetal device 23 being encapsulated by a plastic molding 24. When the battery component part 20 is manufactured using a molding method according to the embodiment as shown in FIG. 3, it is convenient to produce and control the mold in great quantities, because the battery component part 20 is significantly smaller than the whole rechargeable battery, which includes the bare cell 100. Additionally, there is no limitation with regard to a safety valve (not shown) of a cap plate 110 in contrast to a conventional rechargeable battery that is formed by pouring a resin for plastic molding between the protective circuit board 21 and the bare cell 100. Further, it may be Dossible to avoid a gap between the protective circuit board 21 and the bare cell 100 from being filled non-uniformly with a resin for plastic molding due to a modified structure of some electrical components or additional components for increasing the adhesion strength of the resin for plastic molding.

According to the embodiment as shown in FIG. 3, the battery component part 20 includes external input/output terminals 22 and uses a plastic resin molding. However, if desired, the battery component part 20 may form an assembly using a resin and a metallic part in order to encapsulate the protective circuit board 21 and the bimetal device 23, etc.

An electric terminal of the protective circuit board 21 and an electric terminal of the bimetal device 23, each not participating in the series connection between the protective circuit board and the bimetal device, are connected to either the male mechanical bonding parts 25, 27 or a negative electrode connection part 26, at the bottom surface of the battery component part 20. Therefore, the male mechanical bonding part 25 connected to the terminal of the protective circuit board 21 may also function as an electrical connection part.

The surface of the rectangular cap plate 110 generally occupying the smallest area in the bare cell 100 has female mechanical bonding parts 50 at both sides of a longer lateral side, the female mechanical bonding parts 50 being mechanically coupled with the male mechanical bonding parts 25, 27 of the battery component part 20. The female mechanical bonding part 50 may be bonded to the cap plate 110 by a laser welding method, etc., so as to maintain the mechanical bonding strength. In the center of the cap plate 110, a negative terminal 130 of the bare cell 100 is made to protrude while being electrically insulated from the remaining parts of the bare cell.

Preferably, the male mechanical bonding parts 25, 27 are partially embedded in the plastic molding 24 of the battery component part 20 so that they are bonded to the battery component part 20 with a significant mechanical strength. Each end of the male mechanical bonding parts 25, 27, to be bonded to the bare cell 100, has a jaw 251, 271. The female mechanical bonding parts 50 include a sloped V-shaped neck 51 at the entrance thereof. When the male mechanical bonding parts 25, 27 are inserted into the female mechanical bonding parts 50 to couple the battery component part with the bare cell, the V-shaped neck 51 gets wider elastically so that it may receive the jaws 251, 271. When the male mechanical bonding parts 25, 27 are removed, the V-shaped neck 51, which has no sloped portion, is engaged with the jaws 251, 271. Therefore, once the battery component part 20 is coupled with the bare cell 100, it is difficult to separate them from each other. Further, the male mechanical bonding parts 25, 27 and the female mechanical bonding parts 50 are fixed to the battery component part 20 and the bare cell 100, respectively, with a significant strength. Therefore, each of the protective circuit board 21 and the bimetal device 23 in the battery component part 20 is stably coupled with the bare cell 100.

Meanwhile, in the battery component part 20, a negative electrode connection part 26, to which one electric terminal of the bimetal device 23 is connected, is formed by a multi-leaf spring. When the mechanical bonding parts 25, 27, of the battery component part 20 are bonded to the bare cell 100, the multi-leaf spring is in contact with the negative terminal 130 of the bare cell 100 and causes deformation, thereby maintaining contact with the negative terminal 130 over a large area. The negative electrode may form a mechanical bonding structure in the same manner as the positive electrode so as to prevent the separation after bonding.

According to the above-described embodiment, it is possible to stably couple the safety device such as the protective circuit board 21 with the bare cell 100 in the rechargeable battery. Furthermore, the bond formed between the battery component part and the bare cell is not a permanent bond but a detachable bond. This means that when the bare cell 100 has to be discarded due to repeated charge/discharge cycles followed by the termination of its work life, the battery component part can be separated from the bare cell 100 and coupled with another bare cell, so that it can be reused.

For example, when a strong force is applied to draw the battery component part coupled to the bare cell through the mechanical bonding structure as shown in FIG. 3, the V-shaped neck of the female mechanical bonding part 50 loses its elasticity and is plastically deformed into a wider form as shown in FIG. 4. Then, the male mechanical bonding part 25 is separated from the female mechanical bonding part 50, and thus the battery component part 20 is separated from the bare cell 100. Although the female mechanical bonding part 50 of the bare cell 100 cannot be reutilized, it is not problematic because the bare cell 100 itself has to be discarded. For this reason, the bonding strength between the male mechanical bonding part 25 and the battery component part 20 must be greater than the bonding strength between the female mechanical bonding part 50 and the bare cell 100 or the resistance of the female mechanical bonding part 50 against plastic deformation.

According to the above-described embodiment, it is possible to reduce the cost of a rechargeable battery, thereby increasing demand thereof. In other words, since a safety device such as a protective circuit board, a PTC device, a bimetal device, etc., is largely responsible for the cost of the battery components, recycling of a battery component part from a waste rechargeable battery can significantly reduce the manufacturing cost of a rechargeable battery.

Referring to FIG. 5, the rechargeable battery includes a battery component part 20 and a bare cell 100. The battery component part 20 includes a protective circuit board 21 and a bimetal device 23 connected to each other in series through electric terminals, the protective circuit board 21 and a bimetal device 23 being encapsulated by a plastic molding 24. Alternatively, the plastic molding 24 may be substituted with an assembly using a resin and a metallic part.

An electric terminal of the protective circuit board 21 and an electric terminal of the bimetal device 23, each not participating in the series connection between the protective circuit board and the bimetal device, connect to connection leads 28, 29, respectively at the bottom surface of the battery component part 20. The connection leads 28, 29 are then electrically connected to the cap plate 110 of the bare cell 100 and a negative terminal 130, respectively, through a method such as welding.

On the bottom surface of the battery component part, male mechanical bonding parts are formed, separately from the terminals. Since the male mechanical bonding parts 25, 27 have no function as electric terminals, they may be formed of synthetic resins or ceramics in addition to metals. The male mechanical bonding parts 25, 27 may be partially embedded in the plastic molding 24 of the battery component part or may form a part of the plastic molding 24 so that they are bonded to the battery component part 20 with a high strength.

On the cap plate surface 110 of the bare cell facing to the bottom surface of the battery component part 20, female mechanical bonding parts 50 are formed at the positions corresponding to the male mechanical bonding parts 25, 27 so as to be mechanically engaged with the male mechanical bonding parts. Although the female mechanical bonding parts may be formed of ceramics, synthetic resins, etc., in addition to metals, it is preferably formed of metals considering the weldability with the cap plate 110, welding strength, elasticity needed for the engagement with the male mechanical bonding parts, etc.

The male mechanical bonding parts 25, 27 and the female mechanical bonding parts 50 are formed in a similar manner to the embodiment as shown in FIG. 3. In other words, each end of the male mechanical bonding part 25, 27 is bonded with the bare cell 100 and has a jaw 251, 271. The female mechanical bonding parts 50 include a sloped V-shaped neck 51 at the entrance thereof. However, the mechanical bonding structure is not limited to the embodiments as shown in FIGS. 3 and 5.

For the convenience of welding, the connection leads 28, 29 drawn from the bottom surface of the battery component part are formed to have a relatively large length, wherein bending lines 281, 291 are formed in a part of the connection leads 28, 29 with a predetermined interval so that the connection leads are easily bent and folded. Therefore, when the bottom surface of the battery component part 20 approaches the cap plate 110 surface in order to bond the mechanical bonding parts after welding the connection leads to the cap plate 110 and to the negative terminal 130 of the bare cell 100, the connection leads 28, 29 are bent at the bending lines 281, 291, and thus they are partially folded. By doing so, the connection leads having a relatively large length are prevented from protruding out of the battery or from generating short circuit to another electrode terminal.

Meanwhile, the folded part of the connection leads having an increased thickness may interrupt the mechanical bonding between the bare cell and the battery component part. Therefore, it is preferable that a cavity 283 is formed in the vicinity of the part, into which the connection leads 28, 29 are drawn, on the bottom surface of the plastic molding in the battery component part 20, so that the folded connection leads may be contained in the cavity.

According to the embodiment as shown in FIG. 5, the connection leads 28, 29 of the battery component part are connected to the electrode terminals 130, 110 of the bare cell by welding, and thus there is provided an advantage in that electric resistance is low and reliable electric connections can be obtained. Further, even if the electric terminals are welded, the battery component part can be coupled to and reused for another bare cell by disengaging the mechanical bonding between the battery component part and the bare cell and cutting the welded part of the connection lead having a large length.

However, it has to be considered that rechargeable batteries generally have different constitutional materials, shapes, sizes, etc., depending on their manufacturing companies and product models. Since a suitable design of a safety device is determined by such factors, the selection of a safety device for a battery component part depends on the characteristics of the bare cell to be coupled with the battery component part.

When a battery component part is recycled, the battery component part has an increased possibility for being undesirably coupled with an unsuitable bare cell, and thus a way to prevent such undesirable couplings is required. One possible way is to change the position, size and number of mechanical bonding parts in a bare cell and in a battery component part according to the capacity and characteristics of the bare cell, i.e., by forming a so-called "recognition structure". Alternatively, the recognition structure may be obtained by forming both bonding surfaces of the battery component part and the bare cell to have a concave portion and a convex portion, respectively, complementary to each other.

According to the recognition structure having a difference depending on the characteristics of bare cells, it is possible to prevent dangers in use that may be caused by using an unsuitable safety device during charge/discharge of the bare cell. Even though several bare cells are available from different companies and as different product models, one battery component part can be shared among the bare cells if the bare cells have the same characteristics over a certain range, thereby increasing interchangeability.

As can be seen from the foregoing, according to the present invention, it is possible to couple a bare cell with a safety device such as a protective circuit board, a bimetal, etc., in a stable and simple manner.

According to the present invention, it is possible to separate the mechanical bonding parts between a safety device and a bare cell without breaking them, and thus the safety device such as a protective circuit board can be reused even if the bare cell has to be discarded, thereby reducing the cost of the rechargeable battery.

Further, according to the present invention, it is possible to overcome the problems occurring in the prior art that the circumference of a safety valve must be protected during the formation of a plastic molding, and the gap between a safety device and a bare cell may not be uniformly filled with a resin for plastic molding.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A rechargeable battery comprising:
a bare cell composed of an electrode assembly including a negative electrode, a separator, and a positive electrode, a container to house the electrode assembly and an electrolyte, and a cap assembly to close an opening of the container; and
a safety device electrically coupled to an outer surface of the bare cell,
wherein the safety device is coupled to the bare cell by being incorporated into a battery component part comprising a plastic molding that encapsulates the entire safety device, and a bonding surface of the bare cell and a bonding surface of the battery component part, which are to be bonded to each other, each have a bonding part capable of forming a mechanical bond between the bare cell and the battery component part, wherein the bare cell has a female mechanical bonding part comprising a sloped neck at the entrance thereof and the battery component part has a male mechanical bonding part comprising a jaw and
wherein the female mechanical bonding part of the bare cell is detachably engaged with the male mechanical bonding part of the battery component part.

2. A rechargeable battery of claim 1, wherein the bonding surface of the battery component part further includes an electric terminal of the safety device and the bonding surface of the bare cell further includes a positive terminal and a negative terminal, the electric terminal being electrically connected with one of the positive and negative terminals of the bare cell by welding.

3. A rechargeable battery of claim 2, wherein the electrical terminal has at least one bending line, the bending line being bent so that the electrical terminal folds when the battery component part approaches the bare cell in order to engage the bonding parts.

4. A rechargeable battery of claim 3, wherein the battery component part has a cavity at the electrical terminal so that a part of the folded electric terminal is contained in the cavity when the battery component part approaches the bare cell in order to engage the bonding parts.

5. A rechargeable battery of claim 1, wherein at least a part of the bonding part of the battery component part is electrically connected to the electrical terminal of the safety device.

6. A rechargeable battery of claim 1, wherein the bonding parts have a recognition structure obtained by changing at least one of the position, size, and number of the bonding parts depending on the characteristics of the bare cell.

7. A rechargeable battery of claim 6, wherein the recognition structure is obtained by forming the bonding surfaces of the battery component part and the bare cell to have a concave and a convex portion, respectively, complementary to each other.

8. A method of assembling a rechargeable battery including a bare cell comprised of an electrode assembly including a negative electrode, a separator, and a positive electrode, a container for housing the electrode assembly and an electrolyte, and a cap assembly for closing an opening of the container; and a safety device electrically coupled to an outer surface of the bare cell,
the method comprising:
incorporating the safety device into a battery component by encapsulating the entire safety device in a plastic molding; and
coupling the safety device with the bare cell by bonding a bonding surface of the bare cell to a bonding surface of the battery component,
wherein each bonding surface has a bonding part capable of forming a mechanical bond between the bare cell and the battery component part, wherein the bare cell has a female mechanical bonding part comprising a sloped neck at the entrance thereof and the battery component part has a male mechanical bonding part comprising a jaw and
wherein the female mechanical bonding part of the bare cell is detachably engaged with the male mechanical bonding part of the battery component part.

9. A method of assembling a rechargeable battery as in claim 8, wherein the bonding surface of the battery component part further includes an electric terminal of the safety device and the bonding surface of the bare cell further includes a positive terminal and a negative terminal, the electric terminal being electrically connected with one of the positive and negative terminals of the bare cell by welding.

10. A method of assembling a rechargeable battery as in claim 9, wherein the electrical terminal has at least one bending line, the bending line being bent so that the electrical terminal folds when the battery component part approaches the bare cell in order to engage the bonding parts.

11. A method of assembling a rechargeable battery as in claim 10, wherein the battery component part has a cavity at the electrical terminal so that a part of the folded electric terminal is contained in the cavity when the battery component part approaches the bare cell in order to engage the bonding parts.

12. A method of assembling a rechargeable battery as in claim 8, wherein at least a part of the bonding part of the battery component part is electrically connected to the electrical terminal of the safety device.

13. A method of assembling a rechargeable battery as in claim 8 wherein the cap assembly has the female mechanical bonding part.

14. A method of assembling a rechargeable battery as in claim 13 wherein the female mechanical bonding part of the cap assembly includes a sloped V-shaped neck at the entrance thereof.

15. A method of assembling a rechargeable battery as in claim 14 wherein the male mechanical bonding part is inserted into the female mechanical bonding part and the V-shaped neck gets elastically wider so that it may receive the jaws.

16. A method of assembling a rechargeable battery as in claim 15, wherein the bonding parts have a recognition structure obtained by changing at least one of the position, size, and number of the bonding parts depending on the characteristics of the bare cell.

17. A method of assembling a rechargeable battery as in claim 16, wherein the recognition structure is obtained by forming the bonding surfaces of the battery component part and the bare cell to have a concave and a convex portion, respectively, complementary to each other.

18. A method of assembling a rechargeable battery as in claim 15 wherein the battery component part can be separated from the bare cell and reused by applying a strong force to draw away the male mechanical bonding part from the V-shaped neck of the female mechanical bonding part.

* * * * *